United States Patent
Williams (10) Patent No.: US 9,796,096 B2
(45) Date of Patent: Oct. 24, 2017

(54) GRIPPER WITH INDEXABLE SPEED REDUCER

(71) Applicant: PHD, Inc., Fort Wayne, IN (US)

(72) Inventor: Matthew R. Williams, Fort Wayne (IN)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 15/266,314

(22) Filed: Sep. 15, 2016

(65) Prior Publication Data

US 2017/0080578 A1    Mar. 23, 2017

Related U.S. Application Data

(60) Provisional application No. 62/219,826, filed on Sep. 17, 2015.

(51) Int. Cl.
| | |
|---|---|
| *B25J 15/02* | (2006.01) |
| *B25J 15/04* | (2006.01) |
| *B25J 15/00* | (2006.01) |
| *B25J 9/08* | (2006.01) |

(52) U.S. Cl.
CPC .............. *B25J 15/026* (2013.01); *B25J 9/08* (2013.01); *B25J 15/0028* (2013.01); *B25J 15/0408* (2013.01)

(58) Field of Classification Search
CPC .. B25J 15/0253; B25J 15/026; B25J 15/0266; B25J 15/0273; B25J 15/028; B25J 15/0286; B25J 15/0293; B25J 15/04; B25J 15/0408; B25J 19/0025; B25J 9/08; B25B 1/18
USPC .............................................. 294/119.1, 207
See application file for complete search history.

(56) References Cited

U.S. PATENT DOCUMENTS

| | | | |
|---|---|---|---|
| 3,214,989 A | 11/1965 | Wellauer et al. | |
| 3,326,503 A | 6/1967 | Bade | |
| 3,798,991 A | 3/1974 | Kime et al. | |
| 4,020,715 A | 5/1977 | Sollars | |
| 4,897,014 A * | 1/1990 | Tietze ................. | B25J 15/0206 279/2.23 |
| 6,373,218 B2 * | 4/2002 | Takanashi ............. | B25J 15/028 318/568.12 |

(Continued)

FOREIGN PATENT DOCUMENTS

| | | |
|---|---|---|
| CN | 203045734 U | 7/2013 |
| CN | 203973533 U | 12/2014 |

OTHER PUBLICATIONS

Extended European Search Report dated Feb. 15, 2017 for European Application No. 16 18 9378 (7 pages).

*Primary Examiner* — Dean Kramer
(74) *Attorney, Agent, or Firm* — Taylor IP, P.C.

(57) ABSTRACT

A gripper for a robot has a gripper mechanism with a jaw motion input, and a motor speed reducer combination including a speed reducer and a motor. The speed reducer has a motion output. The gripper mechanism has a first pattern of mounting features arranged about the jaw motion input. The speed reducer has a second pattern of mounting features arranged about the motion output. The first pattern of mounting features and the second pattern of mounting features are arranged so that the motor reducer combination may be mounted to the gripper mechanism in at least four indexed positions about the motion output and the jaw motion input.

17 Claims, 7 Drawing Sheets

(56) References Cited

U.S. PATENT DOCUMENTS

| | | | |
|---|---|---|---|
| 7,118,147 B2 * | 10/2006 | Fujii | B25J 15/0253 |
| | | | 294/103.1 |
| 7,490,881 B2 | 2/2009 | Null et al. | |
| 8,123,234 B2 * | 2/2012 | Tomita | B23B 31/16004 |
| | | | 269/164 |
| 2012/0021880 A1 * | 1/2012 | Grupp | B23Q 7/043 |
| | | | 483/69 |

* cited by examiner

GRIPPER WITH INDEXABLE SPEED REDUCER

CROSS REFERENCE TO RELATED APPLICATIONS

This is a non-provisional application based upon U.S. provisional patent application Ser. No. 62/219,826, entitled "GRIPPER WITH INDEXABLE MOTOR SPEED REDUCER", filed Sep. 17, 2015, which is incorporated herein by reference.

BACKGROUND OF THE INVENTION

Grippers are mechanical devices with one or more jaws that are moved toward and away from one another by an electric motor, fluid powered actuator, or other such motion producing actuator. Once moved into a position of contact with the gripped workpiece, the jaws produce a gripping force against the workpiece, to affect subsequent movement of the workpiece.

Such grippers are often used as an end effector attached to the end of a robotic arm, wherein the gripper is driven by an electric motor or fluid rotary actuator, with the rotation of the motor shaft converted to linear motion of the jaws through a screw and nut, i.e.—a power screw, or a rack and pinion arrangement. Such gripper mechanisms are shown, for example, in U.S. Pat. No. 7,490,881 (Null), which discloses a pneumatically powered gripper. It is often desirable to match the required torque and rotational speed of the gripper input to the torque and rotational speed of the motor output with a belt and pulley speed reducer or a gear reducer located between the motor and gripper drive mechanism.

It is further known that the orientation of the reducer is physically fixed relative to the axis of the gripper jaw motion input shaft. Such fixed orientation can result in undesirable physical interference between the motor and speed or gear reducer and portions of the robotic arm during articulation of the arm. What is needed in the art is a way to easily orient the motor and reducer combination so as to eliminate this undesirable physical interference between the motor and speed or gear reducer and portions of the robotic arm during articulation of the arm.

SUMMARY OF THE INVENTION

The present invention is directed to an improved gripper incorporating a reducer and motor which can be indexed about the jaw motion input shaft of the gripper mechanism in order to reduce or eliminate the aforementioned undesirable physical interference between the motor and speed or gear reducer and portions of the robotic arm. Furthermore, the reducer is so configured as to allow indexing of the reducer and motor to be easily accomplished after the gripper is mounted to the robot without the need to detach the gripper from the robot.

In one form, the invention is directed to a gripper for a robot. The gripper has a gripper mechanism with a jaw motion input, and a motor speed reducer combination including a speed reducer and a motor. The speed reducer has a motion output. The gripper mechanism has a first pattern of mounting features arranged about the jaw motion input. The speed reducer has a second pattern of mounting features arranged about the motion output. The first pattern of mounting features and the second pattern of mounting features are arranged so that the motor reducer combination may be mounted to the gripper mechanism in at least four indexed positions about the motion output and the jaw motion input.

In another form, the invention is directed to a robot with gripper. A robot has a gripper mechanism with a jaw motion input and a motor speed reducer combination including a speed reducer and a motor. The speed reducer has a motion output. The gripper mechanism has a first pattern of mounting features arranged about the jaw motion input. The speed reducer has a second pattern of mounting features arranged about the motion output. The first pattern of mounting features and the second pattern of mounting features are arranged so that the motor reducer combination may be mounted to the gripper mechanism in at least four indexed positions about the motion output and the jaw motion input.

In another form, the invention is directed to a method of gripping items with a robot. The method has several steps. The first step is providing a gripper mechanism with a jaw motion input. The second step is providing a motor speed reducer combination including a speed reducer and a motor, the speed reducer having a motion output. The third step is providing a first pattern of mounting features arranged about the jaw motion input on the gripper mechanism. The fourth step is providing a second pattern of mounting features arranged about the motion output on the speed reducer. The fifth step is arranging the first pattern of mounting features and the second pattern of mounting features so that the motor reducer combination may be mounted to the gripper mechanism in at least four indexed positions about the motion output and the jaw motion input. The sixth step is mounting the motor reducer combination to the first pattern of mounting features using the second pattern of mounting features in one of the at least four indexed positions.

An advantage of the present invention is that it provides a way to easily orient the motor and reducer combination so as to eliminate this undesirable physical interference between the motor and speed or gear reducer and portions of the robotic arm during articulation of the robotic arm.

BRIEF DESCRIPTION OF THE DRAWINGS

The descriptions above and the function of this invention will be more clearly defined by reference to the following description of an embodiment in conjunction with the drawings included, wherein.

Corresponding reference characters indicate corresponding parts throughout the several views. The exemplification set out herein illustrates an embodiment of the invention, in one form, and such exemplification is not to be construed as limiting the scope of the invention in any manner.

DESCRIPTION OF INVENTION

For the purpose of discussion, parts contained in the multiple views of FIGS. 1 through 5B will be referenced individually by alphanumeric characters. The embodiments contained in FIGS. 1 through 5B illustrate examples of the invention and are not inclusive of all of its embodiments. Although FIGS. 1 through 5B show a gripper with an electric motor used to generate motive force, it is understood that other embodiments could also include a gripper having a pneumatic or hydraulic rotary actuator or other actuator in place of the electric motor.

Figure 1:
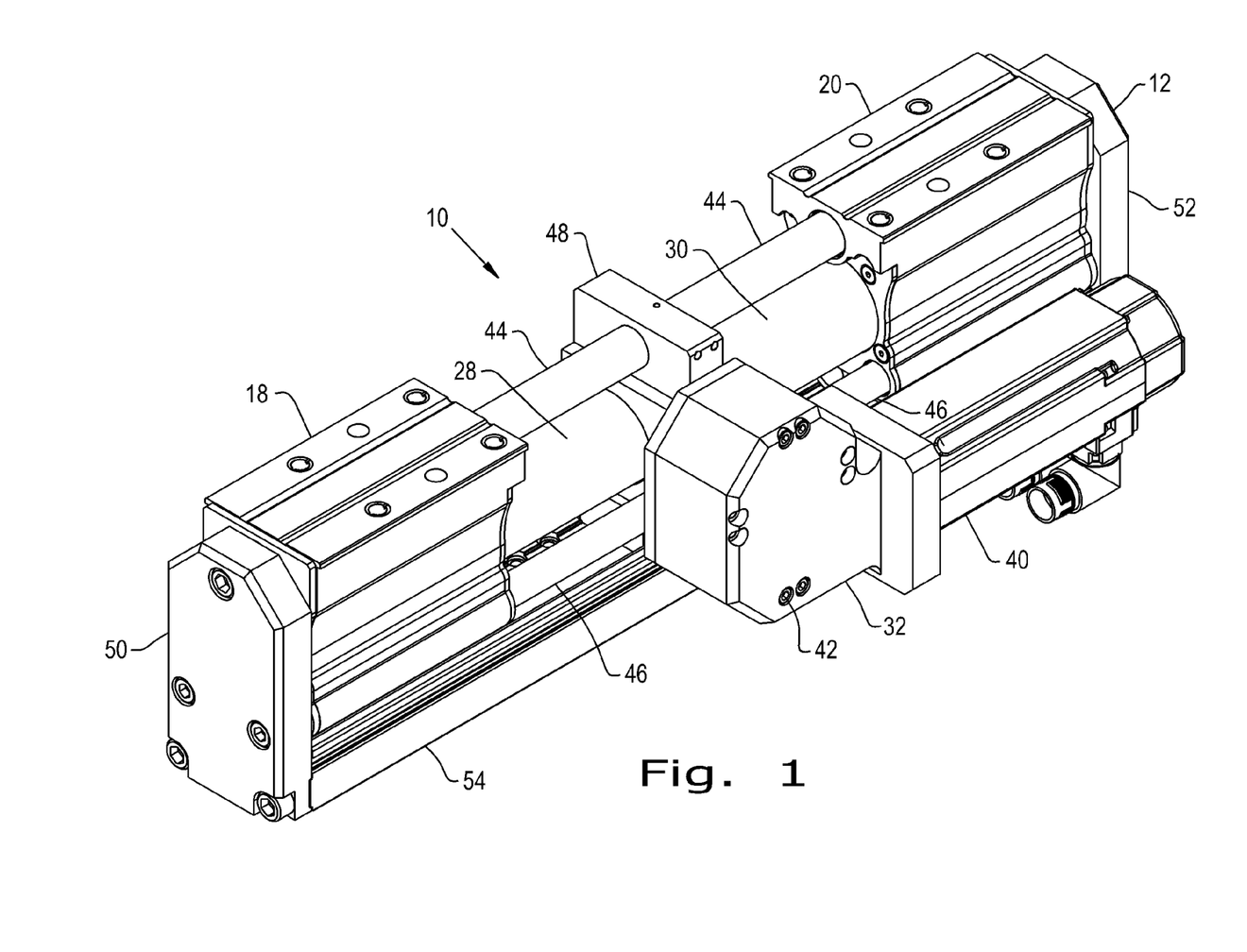
FIG. 1 shows an isometric view of an embodiment of the present invention, a gripper incorporating a reducer and motor which can be indexed about the jaw motion input shaft of the gripper mechanism.

Referring now to FIG. 1, an isometric view of a gripper 10 is shown having a gripping mechanism 12, a motor 40, and a reducer 32 which serves to connect the motor 40 to the gripping mechanism 12. The reducer 32 may be a belt and pulley speed reducer or a gear reducer, or may be another type of reducer of fixed or variable ratio. The gripping mechanism 12 has a base structure 54, a central portion 48 attached to the base structure 54, a first end plate 50 attached to the base structure 54, and a second end plate 52 attached to the base structure 54. The reducer 32 is attached to the central portion 48 using threaded fasteners 42.

Guide bars 44 and 46 extend between the first end plate 50 and the second end plate 52, passing through the central portion 48. A first jaw assembly 18 and a second jaw assembly 20 slide along guide bars 44 and 46, jointly moving between a clamped position wherein the first jaw assembly 18 and the second jaw assembly 20 are close together and near to the central portion 48, and a released position wherein the first jaw assembly 18 and the second jaw assembly 20 are further separated and near to the first end plate 50 and the second end plate 52, respectively. The first jaw assembly 18 and the second jaw assembly 20 are driven between the clamped and released positions by the motor 40 and reducer 32 using one of a number of possible mechanisms contained within tubular covers 28 and 30, one embodiment of such possible driving mechanism being shown in subsequent views.

Figure 2:
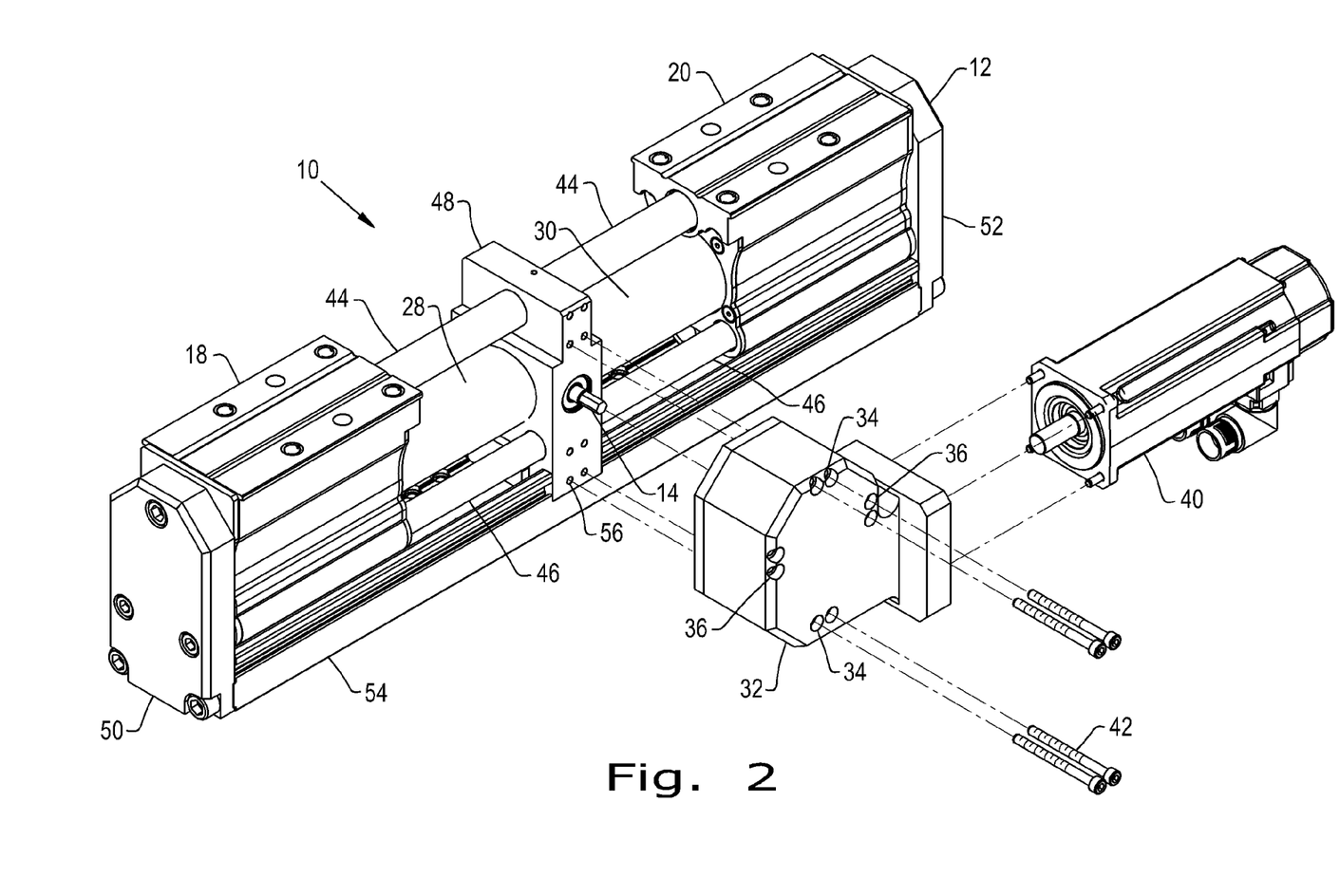
FIG. 2 shows an exploded isometric view of the gripper shown in FIG. 1.
Figure 3:
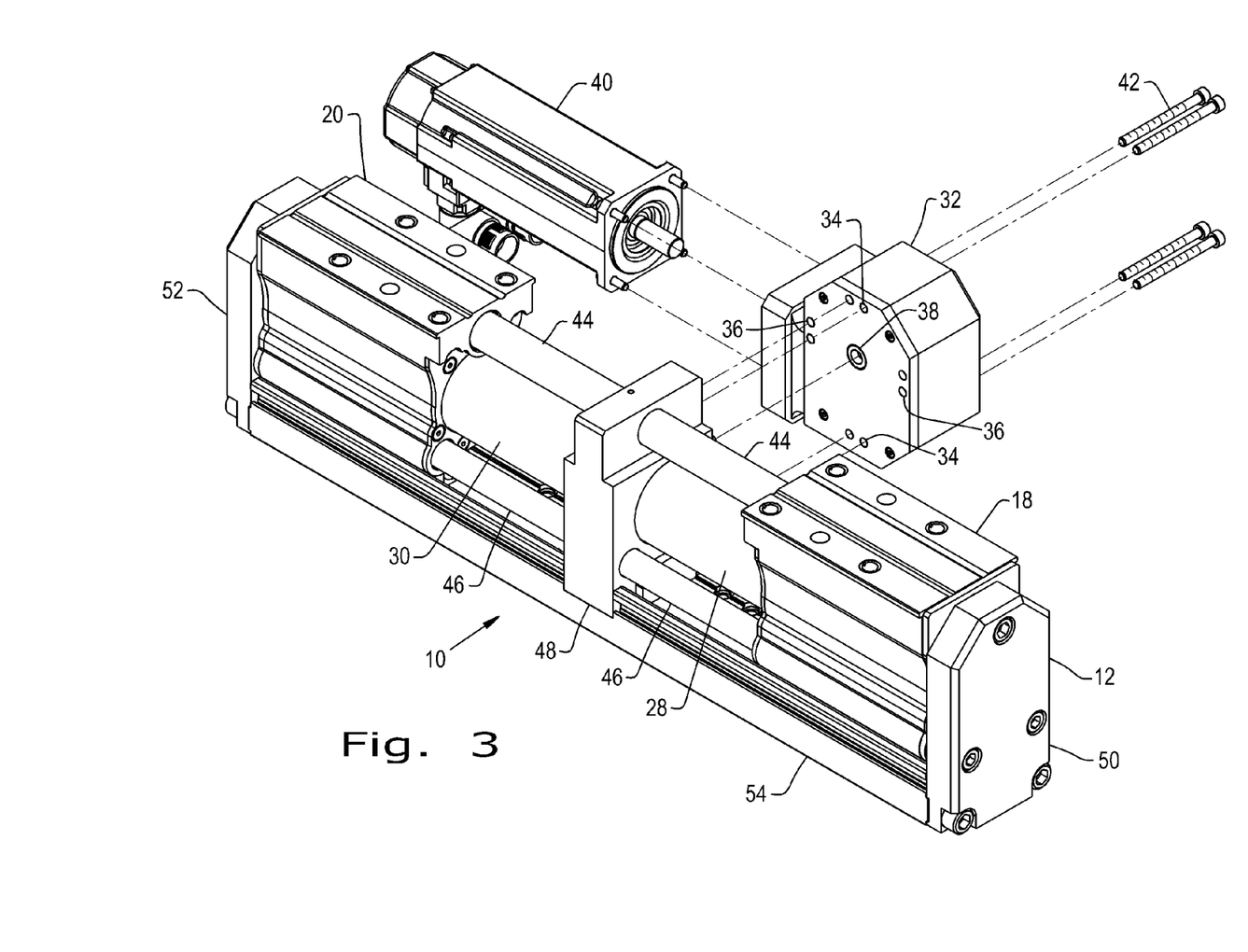
FIG. 3 shows another exploded isometric view of the gripper shown in FIGS. 1 and 2.
Figure 4A:
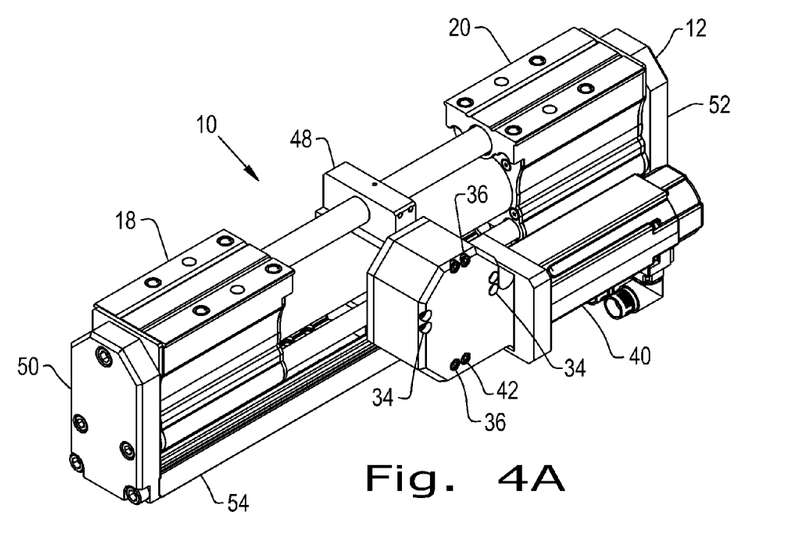
FIG. 4A shows an isometric view of an embodiment of the present invention, a gripper incorporating a reducer and motor indexed in one orientation about the jaw motion input shaft of the gripper mechanism.
Figure 4B:
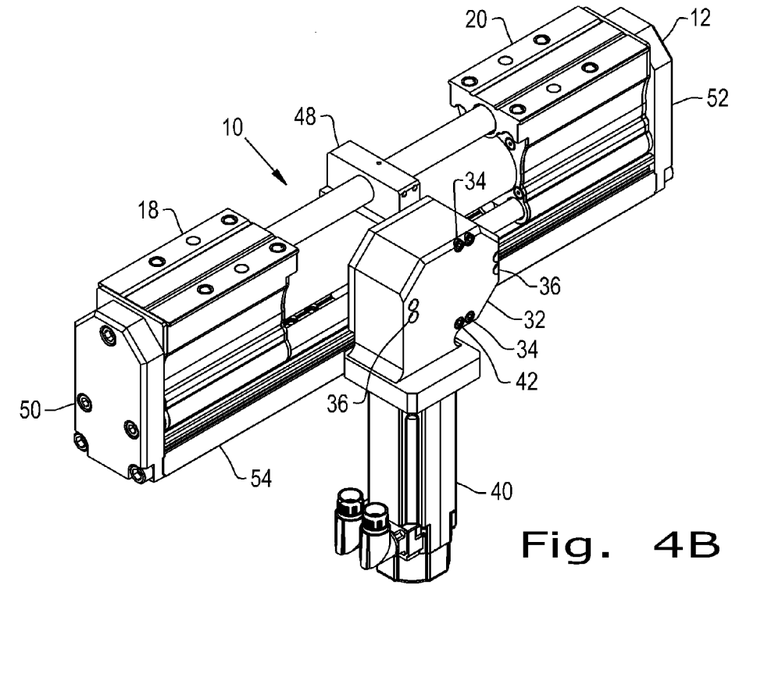
FIG. 4B shows an isometric view of the embodiment of the present invention shown in FIG. 4A, with the reducer and motor indexed in another orientation about the jaw motion input shaft of the gripper mechanism.
Figure 4C:
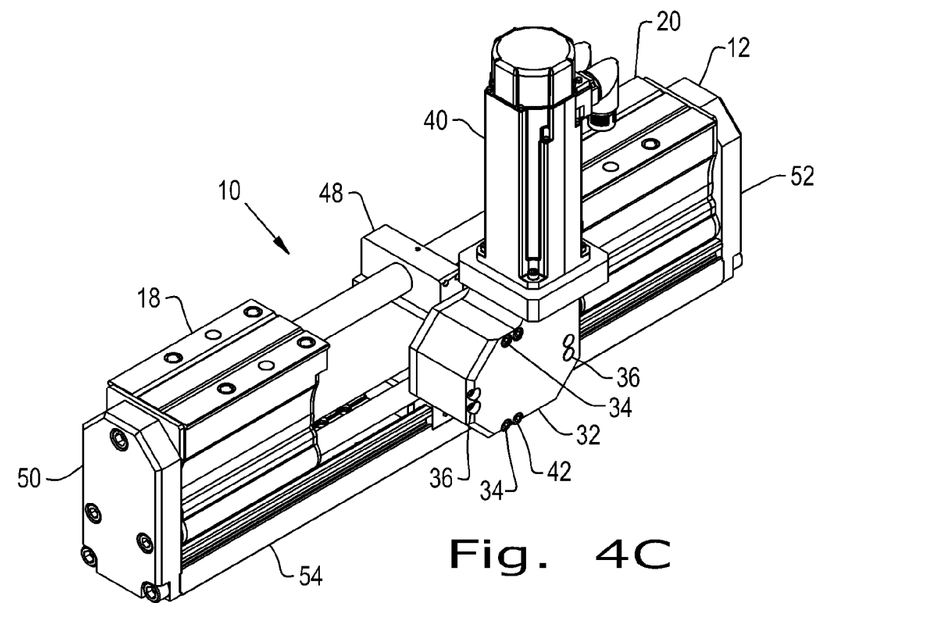
FIG. 4C shows an isometric view of the embodiment of the present invention shown in FIGS. 4A and 4B, with the reducer and motor indexed in another orientation about the jaw motion input shaft of the gripper mechanism.
Figure 4D:
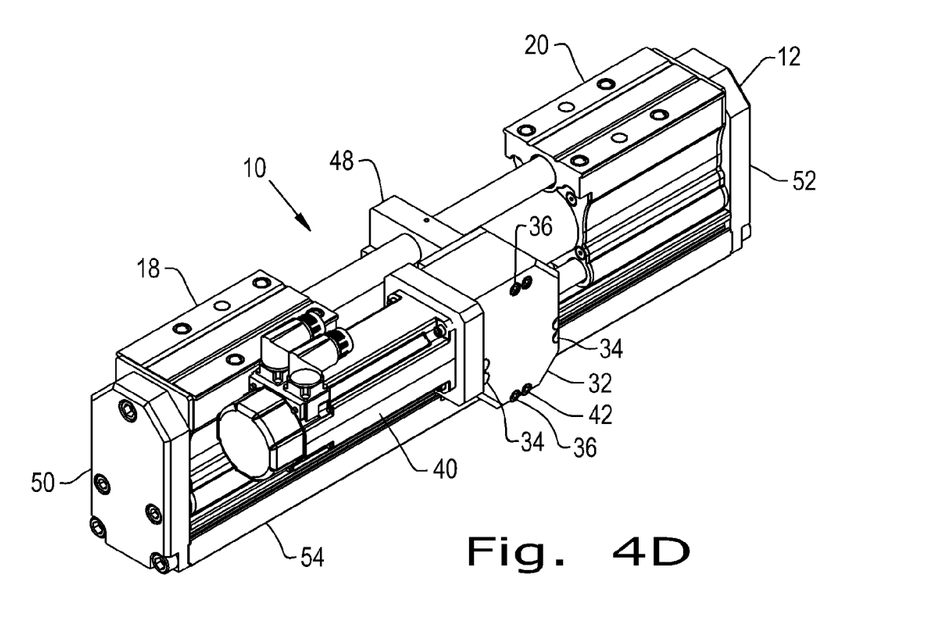
FIG. 4D shows an isometric view of the embodiment of the present invention shown in FIGS. 4A, 4B, and 4D, with the reducer and motor indexed in another orientation about the jaw motion input shaft of the gripper mechanism.

FIGS. 2 and 3 show exploded isometric views of the gripper 10 again having a gripping mechanism 12, a motor 40, and a reducer 32 which serves to connect the motor 40 to the gripping mechanism 12. The gripping mechanism 12 again has a base structure 54, a central portion 48 attached to the base structure 54, a first end plate 50 attached to the base structure 54, and a second end plate 52 attached to the base structure 54. Guide bars 44 and 46 again extend between the first end plate 50 and the second end plate 52, passing through the central portion 48. A first jaw assembly 18 and a second jaw assembly 20 again slide along guide bars 44 and 46, jointly moving between the clamped position and the released position.

The motor 40 attaches to the reducer 32, which then attaches to the central portion 48 using reducer holes 34 or 36, central portion holes 56, and threaded fasteners 42. In this way, rotary motion produced by the motor 40 is changed in orientation and/or ratio, before being transmitted to the jaw motion input shaft 14 of the gripping mechanism 12. As can be seen, the reducer 32 can be indexed to one of four possible positions in the embodiment of the invention shown, by aligning reducer holes 34 or 36 with central portion holes 56. Although the embodiment of the invention shown provides for four possible positions, it is within the scope of the invention that more or less possible positions may be provided, for example by providing additional sets of reducer holes at 45 degree positions in addition to the reducer holes 34 and 36 at 90 degree positions. In each possible indexed position of the reducer 32 and motor 40, a hexagonally shaped socket 38 in the reducer 32 engages a jaw motion input shaft 14 on the central portion 48, thereby providing for transmission of rotation from the output of the reducer 32 to the jaw motion input shaft 14 of the gripping mechanism 12. Tubular covers 28 and 30 again contain the driving mechanism of the first jaw assembly 18 and a second jaw assembly 20.

FIGS. 4A through 4D show the four orthogonal orientations at which the reducer 32 and motor 40 of the illustrated embodiment of the gripper 10 can be indexed relative to the gripping mechanism 12. The gripping mechanism again has a base structure 54, a central portion 48 attached to the base structure 54, a first end plate 50 attached to the base structure 54, and a second end plate 52 attached to the base structure 54. A first jaw assembly 18 and a second jaw assembly 20 again jointly move between the clamped position and the released position. When the reducer 32 and motor 40 are located in the orientations shown in FIGS. 4A and 4D, the threaded fasteners 42 are passed through reducer holes 36 in the reducer 32 to physically attach the reducer 32 to the gripping mechanism 12. When the reducer 32 and motor 40 are located in the orientations shown in FIGS. 4B and 4C, the threaded fasteners 42 are passed through reducer holes 34 in the reducer 32 to physically attach the reducer 32 to the gripping mechanism 12. In this manner, the reducer 32 and motor 40 can be easily indexed about the gripper mechanism 12 jaw motion input shaft 14 by removing the threaded fasteners 42, re-indexing the reducer 32 and motor 40, and replacing the threaded fasteners 42.

Figure 5A:
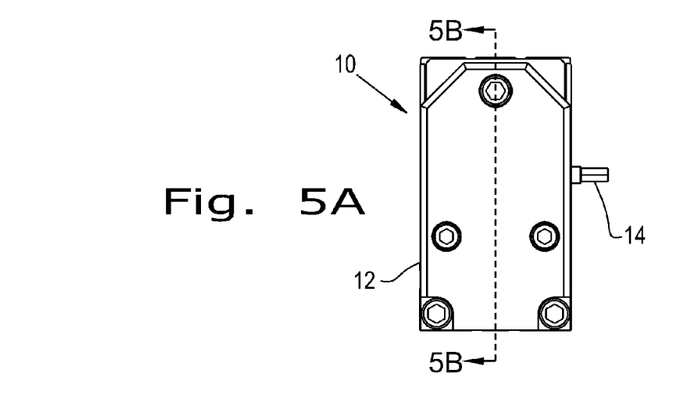
FIG. 5A shows a side view of an embodiment of the present invention, a gripper having the reducer and motor removed to show the input shaft of the gripper mechanism.
Figure 5B:
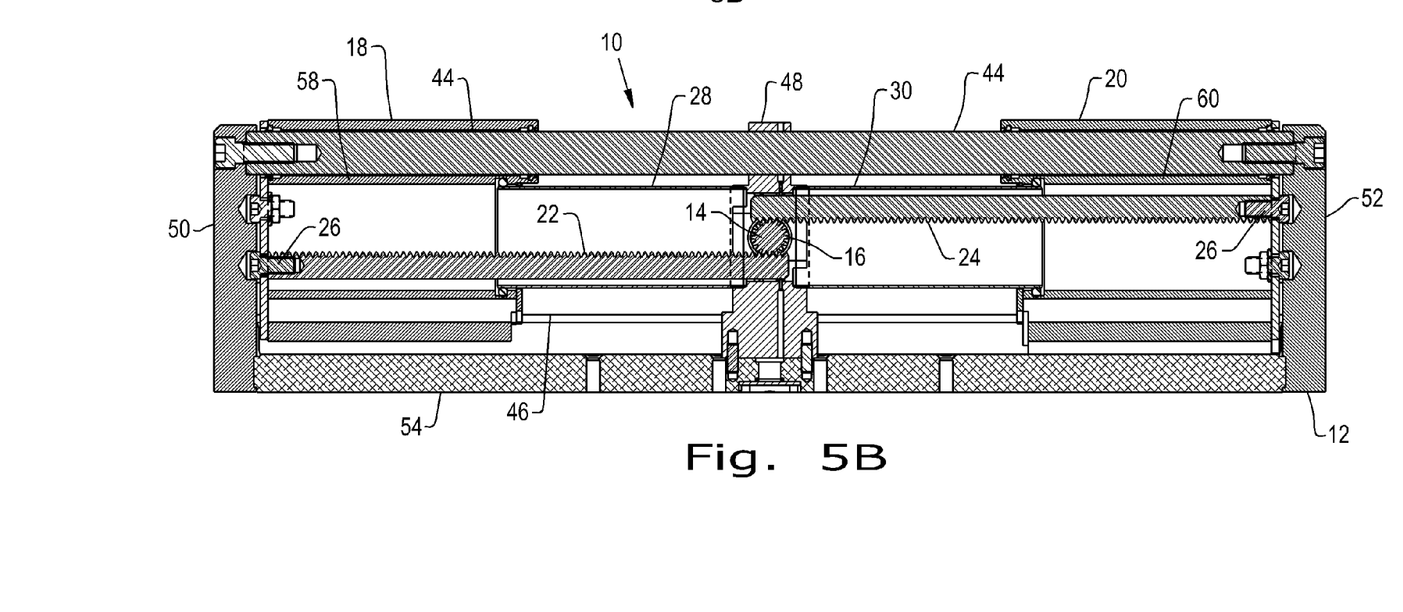
FIG. 5B is a sectional view of the embodiment of the present invention shown in FIG. 5A.
Figure 6:
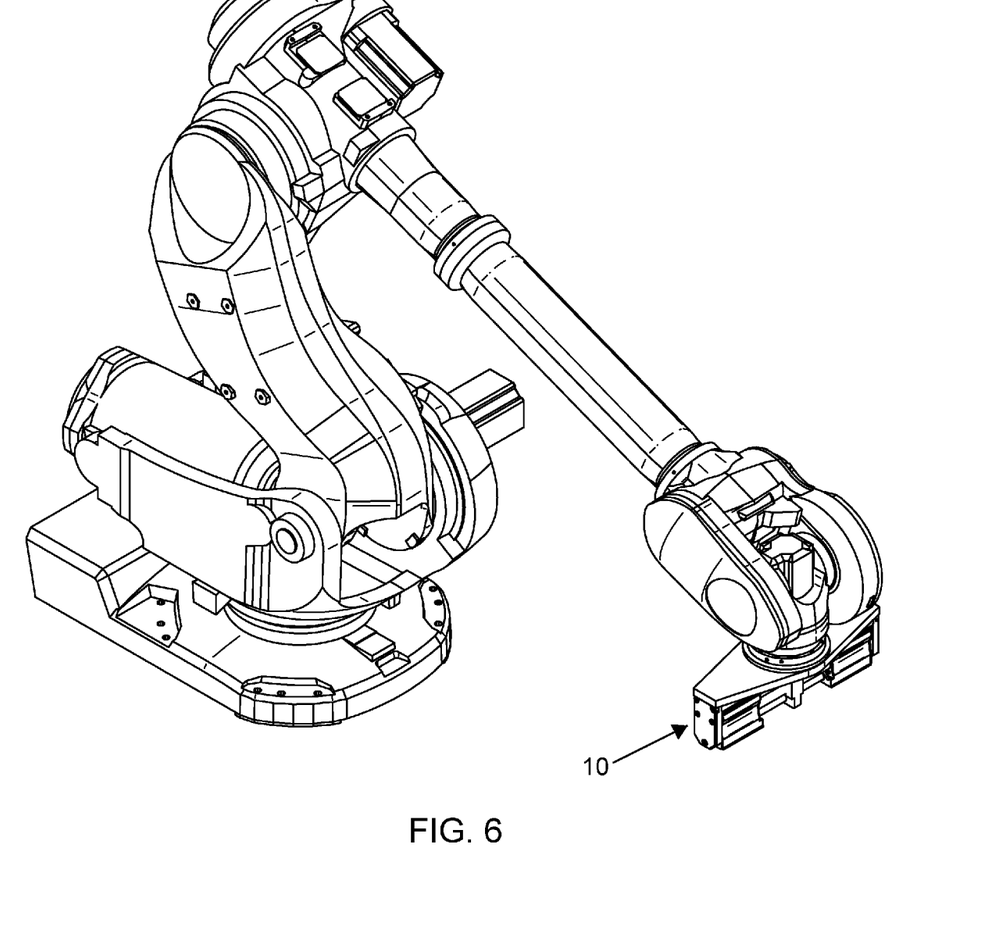
FIG. 6 is a perspective view of a robot which includes the gripper according to the present invention.

FIG. 5A shows an end view of an embodiment of the gripper 10 gripping mechanism 12 having a jaw motion input shaft 14. FIG. 5B shows a cross-sectional view illustrating the internal workings of one embodiment of the gripping mechanism 12 of gripper 10, thereby illustrating the manner by which rotational motion of the jaw motion input shaft 14 is converted into linear motion of the first jaw assembly 18 and the second jaw assembly 20. The gripping mechanism 12 again has a base structure 54, a central portion 48 attached to the base structure 54, a first end plate 50 attached to the base structure 54, and a second end plate 52 attached to the base structure 54. Guide bars 44 and 46 again extend between the first end plate 50 and the second end plate 52, passing through the central portion 48. A first jaw assembly 18 and a second jaw assembly 20 again slide along guide bars 44 and 46, jointly moving between the clamped position and the released position.

A toothed pinion portion 16 of the jaw motion input shaft 14 is supported by suitable bearings (not shown) and is disposed between a first rack 22 attached to the first jaw assembly 18 using fasteners 26, and a second rack 24 attached to the second jaw assembly 20 using fasteners 26.

Rotation of the jaw motion input shaft 14 causes the toothed pinion portion 16 to drive first rack 22 and second rack 24 in opposite linear directions, thereby causing the first jaw assembly 18 and second jaw assembly 20 sliding on guide bars 44 and 46 to move mutually together or apart. As illustrated in FIG. 5B, clockwise rotation of the jaw motion input shaft 14 moves the jaws apart and counterclockwise rotation of the jaw motion input shaft 14 moves the jaws together. Tubular covers 28 and 30 telescope into tubular bores 58 and 60 in first jaw assembly 18 and second jaw assembly 20, respectively. Tubular covers 28 and 30 protect the first rack 22 and the second rack 24 from damage and contamination.

Although FIG. 5B specifically illustrates a rack and pinion arrangement converting rotational motion of the jaw motion input shaft 14 into linear motion of the first jaw assembly 18 and the second jaw assembly 20, it is understood that any suitable mechanism which converts rotational to linear motion may be employed for such purpose. Such additional suitable mechanisms may include but are not limited to a power screw driven, for example, by a worm gear, a ball screw, a cable drive, a linkage, a cam, or a friction drive.

While this invention has been described with respect to at least one embodiment, the present invention can be further modified within the spirit and the scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A gripper for a robot, comprising:
a gripper mechanism having a jaw motion input, said gripper mechanism having a base structure, a central portion attached to said base structure, a first end structure attached to said base structure, and a second end structure attached to said base structure, said gripper mechanism further having a first jaw assembly and a second jaw assembly jointly moving between a clamped position wherein said first jaw assembly and said second jaw assembly are proximate to said central portion, and a released position wherein said first jaw assembly and said second jaw assembly are proximate to said first end structure and to said second end structure, respectively;
a motor speed reducer combination including a speed reducer and a motor, said speed reducer having a motion output;
said gripper mechanism having a first pattern of mounting features arranged about said jaw motion input;
said speed reducer having a second pattern of mounting features arranged about said motion output;
said first pattern of mounting features and said second pattern of mounting features being arranged so that said motor reducer combination may be mounted to said gripper mechanism in at least four indexed positions about said motion output and said jaw motion input, wherein said central portion having said jaw motion input, said first pattern of mounting features being located on said central portion so that said motor reducer combination may be mounted on said central portion of said gripper mechanism in said at least four indexed positions.

2. The gripper of claim 1, wherein:
said speed reducer is a 90° drive speed reducer.

3. The gripper of claim 1, wherein:
said first pattern of mounting features and said second pattern of mounting features further comprise mounting holes, said motor reducer combination being mounted to said gripper mechanism using threaded fasteners.

4. The gripper of claim 1, wherein:
said motor is one of an electric motor, a pneumatic motor, and a hydraulic rotary actuator.

5. The gripper of claim 1, wherein:
said speed reducer is one of a belt and pulley speed reducer and a gear speed reducer.

6. The gripper of claim 1, wherein:
said speed reducer is one of a fixed drive ratio speed reducer and a variable drive ratio speed reducer.

7. The gripper of claim 1, wherein:
said first jaw assembly and said second jaw assembly being driven between said clamped position and said released position by said jaw motion input acting through one of a rack and pinion drive, a power screw drive, a worm gear drive, a ball screw drive, a cable drive, a linkage, a cam, and a friction drive.

8. The gripper of claim 1, wherein:
said motor speed reducer combination may be dismounted from one said indexed position on said gripper mechanism and moved to another said indexed position on said gripper mechanism without detaching said gripper mechanism from the robot.

9. A robot with gripper, comprising:
a robot;
a gripper mechanism having a jaw motion input, said gripper mechanism having a base structure, a central portion attached to said base structure, a first end structure attached to said base structure, and a second end structure attached to said base structure, said gripper mechanism having a first jaw assembly and a second jaw assembly jointly moving between a clamped position wherein said first jaw assembly and said second jaw assembly are proximate to said central portion, and a released position wherein said first jaw assembly and said second jaw assembly are proximate to said first end structure and to said second end structure, respectively;
a motor speed reducer combination including a speed reducer and a motor, said speed reducer having a motion output;
said gripper mechanism having a first pattern of mounting features arranged about said jaw motion input;
said speed reducer having a second pattern of mounting features arranged about said motion output;
said first pattern of mounting features and said second pattern of mounting features being arranged so that said motor reducer combination may be mounted to said gripper mechanism in at least four indexed positions about said motion output and said jaw motion input, wherein said central portion having said jaw motion input, said first pattern of mounting features being located on said central portion so that said motor reducer combination may be mounted on said central portion of said gripper mechanism in said at least four indexed positions.

10. The robot of claim 9, wherein:
said speed reducer is a 90° drive speed reducer.

11. The robot of claim 9, wherein:
said first pattern of mounting features and said second pattern of mounting features further comprise mounting holes, said motor reducer combination being mounted to said gripper mechanism using threaded fasteners.

12. The robot of claim 9, wherein:
said motor is one of an electric motor, a pneumatic motor, and a hydraulic rotary actuator.

13. The robot of claim 9, wherein:
said speed reducer is one of a belt and pulley speed reducer and a gear speed reducer.

14. The robot of claim 9, wherein:
said speed reducer is one of a fixed drive ratio speed reducer and a variable drive ratio speed reducer.

15. The robot of claim 9, wherein:
said first jaw assembly and said second jaw assembly being driven between said clamped position and said released position by said jaw motion input acting through one of a rack and pinion drive, a power screw drive, a worm gear drive, a ball screw drive, a cable drive, a linkage, a cam, and a friction drive.

16. The robot of claim 9, wherein:
said motor speed reducer combination may be dismounted from one said indexed position on said gripper mechanism and moved to another said indexed position on said gripper mechanism without detaching said gripper mechanism from the robot.

17. A method of gripping items with a robot, comprising the steps of:
providing a gripper mechanism having a jaw motion input, said gripper mechanism is provided with a base structure, a central portion attached to said base structure, a first end structure attached to said base structure, and a second end structure attached to said base structure, said gripper mechanism is further provided with a first jaw assembly and a second jaw assembly jointly moving between a clamped position wherein said first jaw assembly and said second jaw assembly are proximate to said central portion, and a released position wherein said first jaw assembly and said second jaw assembly are proximate to said first end structure and to said second end structure, respectively;
providing a motor speed reducer combination including a speed reducer and a motor, said speed reducer having a motion output;
providing a first pattern of mounting features arranged about said jaw motion input on said gripper mechanism;
providing a second pattern of mounting features arranged about said motion output on said speed reducer;
arranging said first pattern of mounting features and said second pattern of mounting features so that said motor reducer combination may be mounted to said gripper mechanism in at least four indexed positions about said motion output and said jaw motion input; and
mounting said motor reducer combination to said first pattern of mounting features using said second pattern of mounting features in one of said at least four indexed positions wherein said central portion is provided with said jaw motion input, said first pattern of mounting features being located on said central portion so that said motor reducer combination may be mounted on said central portion of said gripper mechanism in said at least four indexed positions.

* * * * *

UNITED STATES PATENT AND TRADEMARK OFFICE
CERTIFICATE OF CORRECTION

PATENT NO. : 9,796,096 B2  
APPLICATION NO. : 15/266314  
DATED : October 24, 2017  
INVENTOR(S) : Matthew R. Williams Page 1 of 1

It is certified that error appears in the above-identified patent and that said Letters Patent is hereby corrected as shown below:

On the Title Page

Item (54) and in the Specification, Column 1 Line 1 for the title, between "INDEXABLE" and "SPEED", please insert therefore --MOTOR--.

Signed and Sealed this  
Fourth Day of December, 2018

Andrei Iancu  
*Director of the United States Patent and Trademark Office*